UNITED STATES PATENT OFFICE.

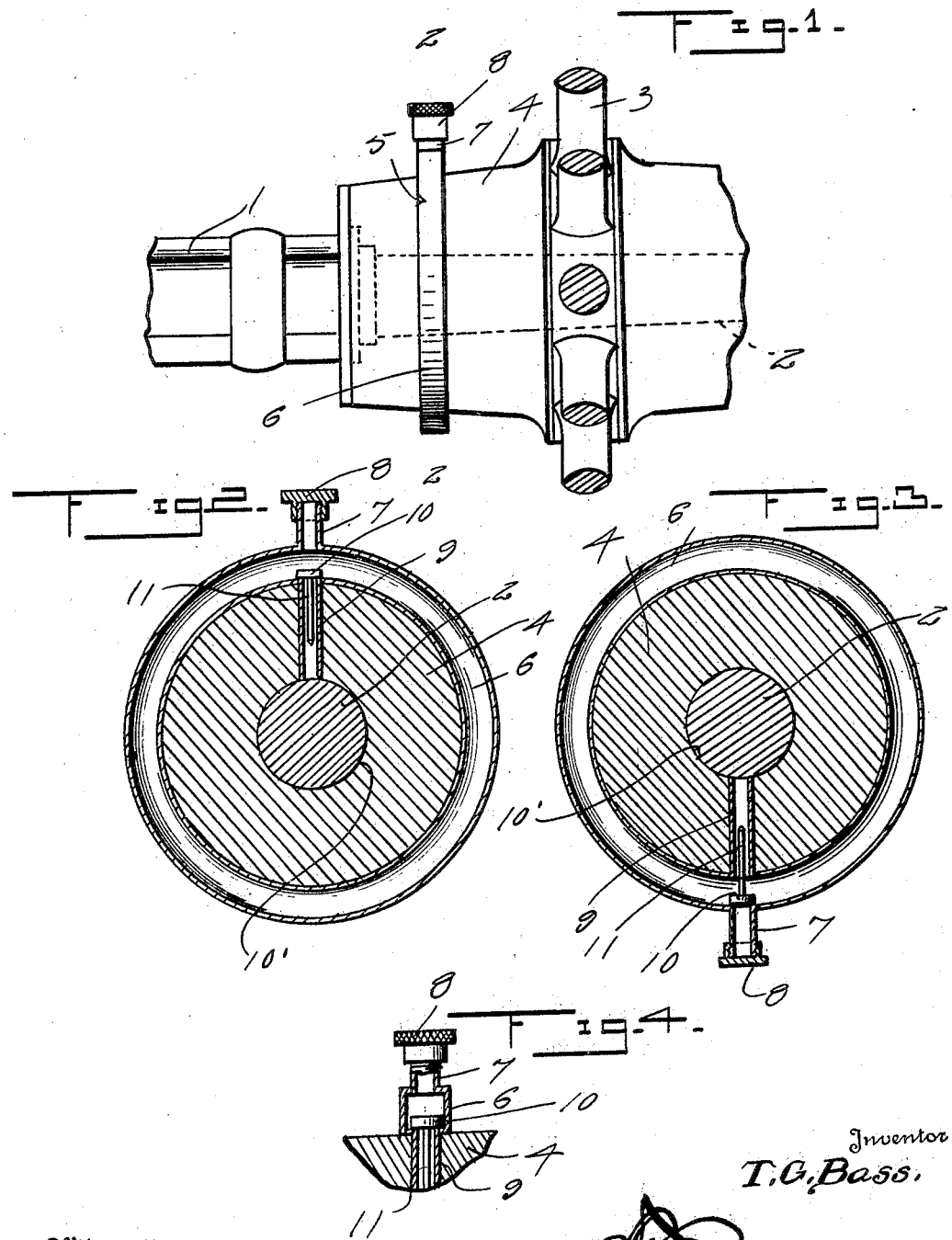

THOMAS G. BASS, OF SPUR, TEXAS.

AXLE-LUBRICATOR.

1,397,352.   Specification of Letters Patent.   Patented Nov. 15, 1921.

Application filed August 22, 1917. Serial No. 187,675.

*To all whom it may concern:*

Be it known that I, THOMAS G. BASS, a citizen of the United States, residing at Spur, in the county of Dickens and State of Texas, have invented certain new and useful Improvements in Axle-Lubricators; and I do hereby declare the following to be a full, clear, and exact description of the invention, such as will enable others skilled in the art to which it appertains to make and use the same.

This invention relates to a lubricator for vehicle axles and the primary object of the invention is to provide a device which will effectively lubricate the bearing surface of the spindle of a vehicle axle during the rotation of the wheels which are mounted upon the spindles, thereby eliminating the necessity of manually lubricating the spindles.

More specifically, the object of this invention is to provide a circular lubricant retaining tube which is mounted about the hub of a vehicle wheel, and has an opening formed therein which communicates with a radially extending tube, which radially extending tube extends to the spindle, so that lubricant flowing from the circular tube into the radial tube will upon rotation of the tube to an upper or a position above the center of the spindle, flow upon the spindle for lubricating the same and further to provide a gravity actuated valve member which controls the passage of the lubricating liquid or oil into the radially extending tube.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawing wherein like characters designate like and corresponding parts throughout the several views, and in which:

Figure 1 is a side elevation of the improved lubricator showing the same applied to a fragment of the wheel hub, Fig. 2 is a section on the line 2—2 of Fig. 1 showing the radial tube positioned above the spindle, Fig. 3 is a view similar to Fig. 2 showing the radially extending tube below the spindle and in a lubricant receiving position, and Fig. 4 is a fragmentary section taken transversely to the section illustrated in Figs. 2 and 3.

Referring more particularly to the drawings, 1 designates a vehicle axle, which has the usual form of spindle 2 formed upon its outer end, upon which the wheel 3 is rotatably mounted. The wheel 3 has the usual type of hub 4 and the improved lubricating device, generally indicated by the numeral 5, is mounted about the portion of the hub 4 which extends inwardly toward the axle 1 from the spokes of the wheel.

The lubricator 5 includes a circular tube 6 which extends around the hub 4 and has a filling extension 7 formed thereon which is closed by a closure cap 8. The cap 8 is removably mounted upon the filling extension 7 so that it may be easily and quickly removed for filling the tube 6 with any desired type of lubricating oil.

A tube 9 extends diametrically through the hub 4 and communicates with the bore 10′ of the hub in which the spindle 2 rotates and it also communicates with the tube 6 directly in alinement with the extension 7, providing means for permitting the lubricating oil to flow to the bearing surfaces between the spindle and the hub.

A gravity actuated valve 10 is provided for controlling the passage of lubricant from the tube 6 into the tube 9 and it has a pin 11 formed thereon which extends into the tube 9.

During the rotation of the wheel 3; when the tube 9 is below the spindle 2, as shown in Fig. 3 of the drawings, the valve 10, by its own weight, will be unseated, and the force or weight of the lubricant in the tube 6 will force a limited quantity thereof upwardly into the tube 9 so that when the tube 9 moves above the spindle 2, the lubricant which has been forced therein will flow downwardly through this tube into the bore 10′ of the hub 4 for lubricating the bearing surfaces of the hub and spindle. When the tube 9 is above the spindle 2, the valve 10 will be seated, and prevent lubricant from flowing into the tube 9.

In reducing the invention to practice, certain minor features of construction, combination and arrangement of parts may necessitate alterations to which the patentee is entitled, provided such alterations are comprehended within the scope of what is claimed,

What is claimed is:—

A lubricator having an endless annular reservoir for attachment to the hub periphery of a rotary member, a filling tube, a removable closure therefor, a discharge tube alined with said tube and extending in the opposite direction, a gravity actuated valve having a head to close the filling tube at a distance from said closure and to close the discharge tube; and an anchoring stem disposed in one of said tubes.

In testimony whereof I affix my signature in presence of two witnesses.

THOMAS G. BASS.

Witnesses:
W. D. WILSON,
W. D. SHERROD.